United States Patent [19]
Akaba et al.

[11] 3,978,386
[45] Aug. 31, 1976

[54] SERVO SYSTEM FOR FINISHING OBJECTS MATERIALS

[75] Inventors: Hayao Akaba, Akishima; Akira Ikeda, Fussa; Sho Michihiro, Sagamihara; Masayoshi Lee, Kawasaki, all of Japan

[73] Assignee: Kabushiki Kaisha Hoya Lens, Tokyo, Japan

[22] Filed: Dec. 6, 1974

[21] Appl. No.: 530,489

[30] Foreign Application Priority Data
Dec. 18, 1973  Japan............... 48-142068

[52] U.S. Cl................ 318/626; 318/601; 318/569; 318/570
[51] Int. Cl.² ......................... G05G 5/00
[58] Field of Search ............ 318/626, 601, 570, 569

[56] References Cited
UNITED STATES PATENTS
3,697,779  10/1972  Gee................ 318/601 X
3,786,331  1/1974  Sommeria............ 318/570
3,840,794  10/1974  Clement............. 318/601 X

*Primary Examiner*—B. Dobeck
*Attorney, Agent, or Firm*—Cushman, Darby & Cushman

[57] ABSTRACT

A servo system to permit the lens finishing for example, corresponding to a registered pattern and permit such finishing at desired pressure, etc. for the conveniences of the easy and effective grinding and finishing, in a manner that the detectors supply to the lower and upper limit voltage comparators the detectors outputs, which are then supplied to the logic circuits as well as the outputs for the servo-driving and the outputs from flip-flops, so that the servo motor rotates in normal and/or reverse directions.

2 Claims, 4 Drawing Figures

SERVO SYSTEM FOR FINISHING OBJECTS MATERIALS

BACKGROUND OF THE INVENTION

1. Field of the Invention

This invention relates to a novel servo system to permit the lens finishing corresponding to a registered pattern and permit such finishing at desired pressure with easy and effective grinding and finishing.

2. Description of the Prior Art

In the prior art, the automatically sequentially logic system providing the required grinding and finishing of the objective materials such as spectacle lenses are not so effectively performed.

SUMMARY OF THE INVENTION

For providing an effective and convenient system, the applicant invented a novel servo system to permit the lens finishing for example, corresponding to a registered pattern and permit such finishing at desired pressure, etc. for the conveniences of the easy and effective grinding and finishing, in a manner that the detectors supply to the lower and upper limit voltage comparators the detectors outputs, which are then supplied to the logic circuits as well as the outputs for the servo-driving and the outputs from flip-flops, so that the servo motor rotates in normal and/or reverse directions.

BRIEF DESCRIPTION OF THE ACCOMPANYING DRAWINGS

Figure 1:
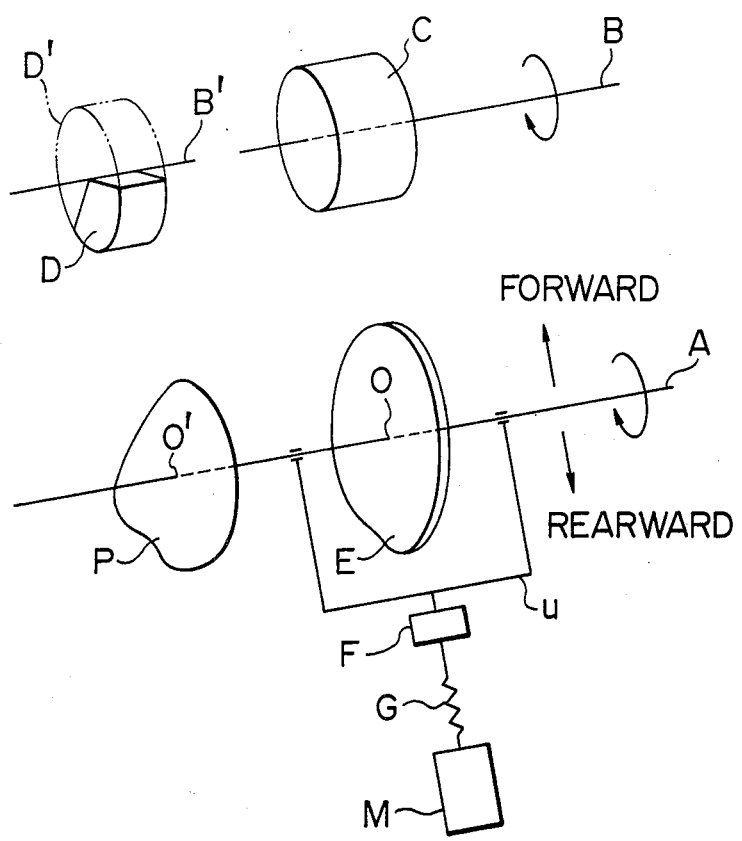
Figure 2:
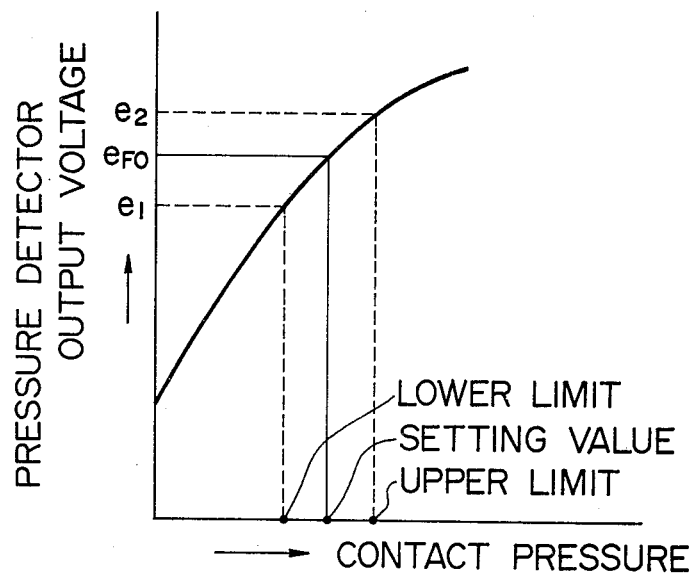
Figure 3:
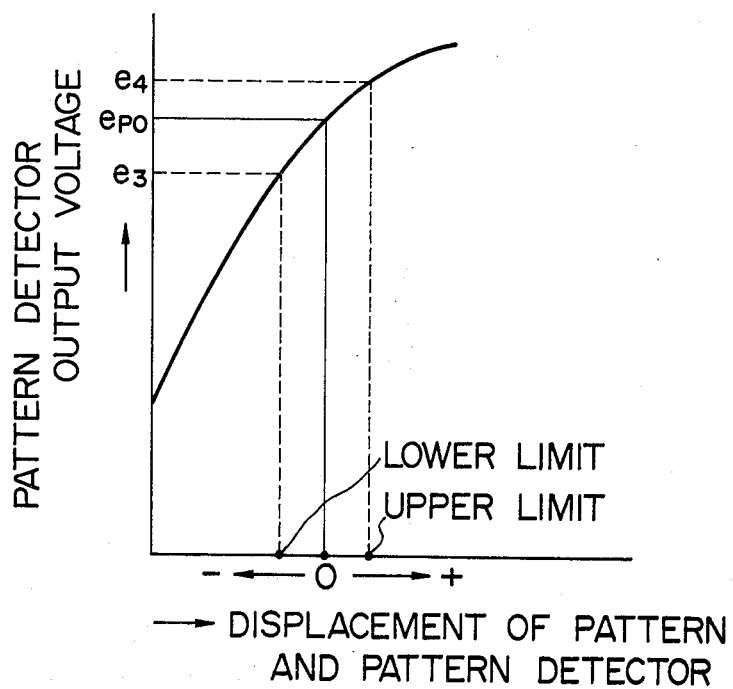
Figure 4:
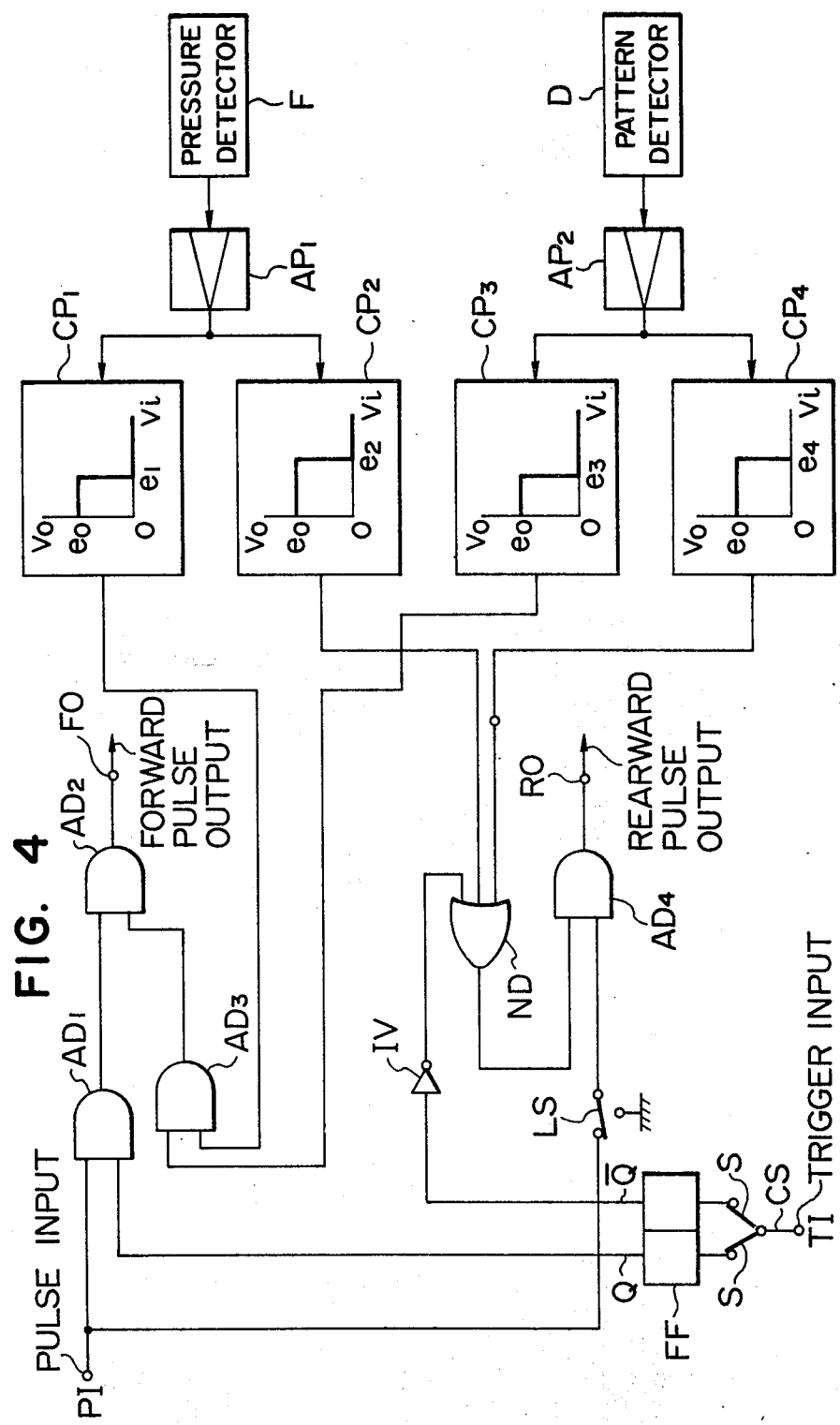

FIG. 1 is a theoretical view of the lens finishing according to the preferred embodiments of this invention, FIGS. 2 and 3 are characteristic curves showing relations of the contact pressure vs. pressure detector output voltage, and the pattern and pattern detector vs. pattern detector output voltage, respectively, and FIG. 4 is an electric logic system circuit of the preferred embodiments.

Now, the preferred embodiments will be hereinafter described with reference to the accompanying drawings.

As an example of the application to the automatic lens grinding device, FIG. 1 shows a lens for an optical spectacle as the finishing object E, and a desired lens pattern P, both of which are fixed on the axis A protruding the nearly centres O, O' and rotated at a low speed. Said axis is provided with U-shape member U, which is coupled with a servo motor such as a pulse motor M through a pressure detector and a flexible spring member G for reciprocal movement.

Parallel to the axis A, axis B, B' are provided on said axis A and said axis B is secured with a grinding machine and the axis being rotated in the same direction, while said axis B' is fixed with a pattern detector D which is a circular member with notched portion formed of this disc D' having the same diameter as that of the grinding machine C, for example.

The characteristic curve of the contact pressure of the objective lens E against the grinding machine and the output voltage of the pressure detector F is shown in FIG. 2, while where the output voltage of the detector is $e_{F_0}$ and the lower and upper limit voltage are $e_1$ and $e_2$, respectively, those voltage are amplified through the amplifier $AP_1$ and then supplied to the upper and lower limit voltage comparators $CP_1$ and $CP_2$, respectively.

The characteristic curve of the output voltage with respect to the displacement of the lens pattern P and its corresponding pattern detector D is shown in FIG. 3, while where the output voltage is $e_{F_0}$ when the tolerance is 0 (zero), and lower and upper limit voltages within a range of permissible tolerance of the finishing are $e_2$ and $e_4$, respectively, said voltages are amplified through the amplifier $AP_2$ as shown in FIG. 4, and then supplied to lower and upper limit voltage comparators $CP_3$ and $CP_4$, respectively.

To this end, in the figures showing the characteristics, $V_O$ is the output voltage, $V_1$ is the input voltage, and $e_0$ is the output voltage for the respective input voltage.

FIG. 4 shows a pulse input end PI, flip-flop FF supplied through a changeover switch CS from the trigger input terminal TI, a limitter switch LS actuated by the flexible spring member G for its reciprocal movement, logic AND circuits $AD_1$, $AD_2$, $AD_3$, $AD_4$, a logic NAND circuit ND, an inverter IV, an output terminal FO for forward, and an output terminal RO for rearward, and those parts are connected to the voltage comparators as shown in the FIG. 4.

Hereinafter the function of the embodiments are described. The flip-flop FF actuates and/or stops the servo system. At the beginning of its action, it has the changeover switch CS contacted with the contacts S thereby supplying the trigger input to the flip-flop so as to make the output Q be in the condition of logic 1. Then the pulse from the pulse input terminal and the output Q are supplied to the logic AND circuit $AD_1$, of which output is then supplied to the logic AND circuit $AD_2$, while when the inputs from the pressure detector F and pattern detector D supplied to the voltage comparators $CP_1$ and $CP_3$, respectively do not reach the lower output voltages $e'_1$ and $e'_3$, the predetermined output voltages are transmitted from the voltage comparators and remain in the condition of the logic 1. Therefore, said output voltages are fed through the AND circuit $AD_3$ to the AND circuit $AD_2$, then pulse outputs being supplied from the forward output terminal FO to the servo motor M thereby rotating said motor and then causing the axis A to move forward through the flexible spring G, whereby the objective lens element E is in contact with the grinding machine C to grind the lens and the lens pattern P is urged closer toward the pattern detector D.

Thus, the contact pressure of the objective lens element E against the grinding machine C increase, then the output caused by the above to the comparator $CP_1$ exceeding the lower limit output voltage $e'_1$, the output of the comparator becomes zero, then the outputs of the AND circuit $AD_3$, $AD_2$ become logic zero, then the servo system stops whereas when the input into the comparator $CP_1$ reaching the upper limit voltage $e'_2$ after contact pressure to the objective lens element has been increased by the motor revolution, the output of the voltage comparator $CP_2$ becomes logic zero and logic 1 at the NAND circuit ND thereby providing the output thereof, but the pulse input being applied in the AND circuit from the input terminal PI thereby generating pulse output in the rearward output terminal RO through said AND circuit, the servo system is caused to be rearwarded. Thus, by automatically controlling the servo system wherein the contact pressure of the objective lens element E against the grinding machine C is to be positioned between the upper and lower limits, the lens finishing is made, during which the servo motor is controlled only by a pressure detector F.

As the grinding is proceeding, the lens element E becomes smaller, and the pattern detector D comes closer to the pattern to begin its detection. When the output voltage of the detector reaches lower limit voltage $e'_3$, the output of the voltage detector $CP_3$, becomes zero state thereby causing the outputs of the AND circuits $AD_3$, $AD_2$ to be zero not to permit the forward output terminal FD to emit the pulse signals so that the servo system is stopped while the output of said detector reaching the upper limit output voltage $e'_4$, the output voltage of the comparator becomes logic zero and logic 1 in the NAND circuit ND, then arrives at the AND circuit $AD_4$, then causes the rearward output terminal RO to emit the pulse output, which then urges the servo system rearward. Thus, by automatically controlling the servo system wherein the output voltage caused by the pattern detector D for the pattern P is to be between the upper and lower limits so as to grind the objective lens element E, at which end of the operation said servo system is controlled only by the output voltage of the pattern detector thereby permitting the finishing the lens as the same shape of the pattern.

After the completion of the desired finishing, the changeover switch CS is switched over to the contact R so as to have the output $\overline{Q}$ of the flip-flop being logic 1, said signals being inverted through the inverter IV, then returning to theory 1, which then causes it to be logic 1 at the NAND circuit, then causes the rearward output terminal RO to emit the pulse output, which causes the flexible spring G rearward by means of the motor M, and when it returns to the original starting point, the limit switches LS switche off the pulse supply circuit, thereby terminating all the actions of the servo system.

When required, it is permitted to raise its stability of the motion of the servo system with application of hysteresis to each voltage comparator. Addition the pattern P registered mechanically as shown in FIG. 1, the patterns registered optically and magnetically are employed.

Thus, in lens finishing employing the foregoing servo system for finishing lens, said embodiments are applied to the detection of the grinding pressure and then also to the pattern detection in order, whereby the objective lens element is automatically ground and finished according to the pattern registered as well as that its grinding and finishing is automatically performed according to the desired contact pressure, so that the considerably difficult grinding and finishing of the lens is automatically performed, and therefore, the mass production is available.

We claim:

1. A servo system for finishing objective material lens comprising:
   a. a detector for detecting pressure of the objective lens element against the grinding machine for supplying the output voltage therefrom to a plurality of lower and upper limit logic zero in their upper and lower voltages, respectively;
   b. said lower and upper limit voltage comparators receiving output voltages from the pattern detector corresponding to the registered pattern where the outputs become logic zero in their lower and upper limit voltages;
   c. a pulse input terminal;
   d. a flip-flop; and
   e. a logic circuit connecting all said (a), (b), (c) and (d); whereby at first the forward pulse outputs are supplied to the servo system for finishing device until said lower limit output voltage is supplied to said lower limit voltage comparator, while said upper voltage being supplied from said pressure detector to said upper limit voltage comparator, the rearward pulse outputs are supplied to the servo system, after which as said pattern come closer to the pattern detector, the forward pulse outputs are supplied to the servo system until said lower limit output voltage is supplied from the pattern detector to the lower limit voltage comparator; and the upper limit voltage being supplied from the pattern detector to the upper limit voltage comparator, the rearward pulse outputs are supplied to the servo system.

2. A servo system as in claim 1 wherein said logic circuit includes an AND circuit and NAND circuit, which supply said forward pulse and backward pulse, respectively.

* * * * *